Oct. 6, 1925.
A. WAHLSTROM
TRAP
Filed Aug. 5, 1924     2 Sheets-Sheet 1
1,556,136
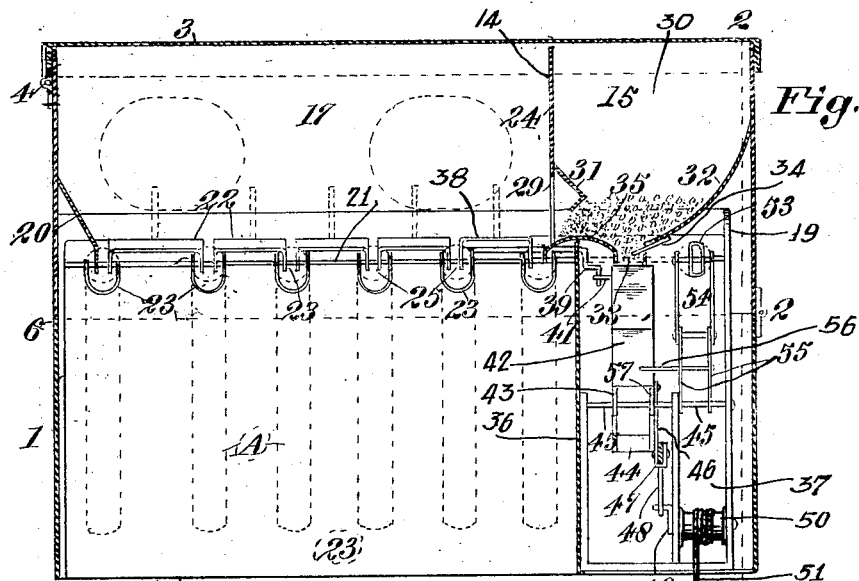
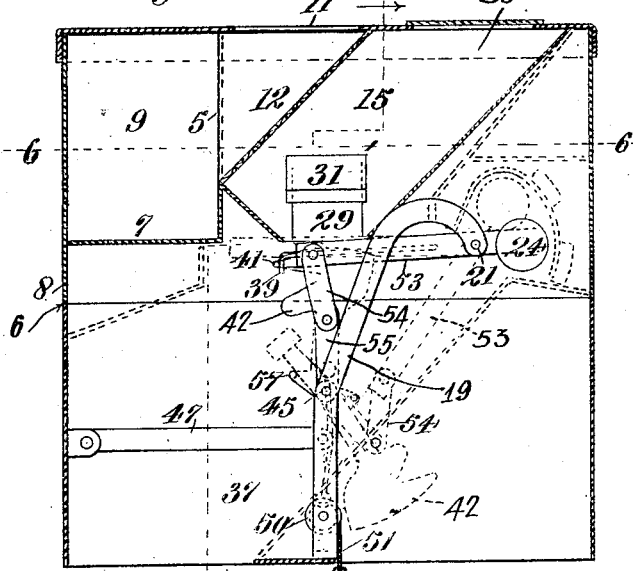
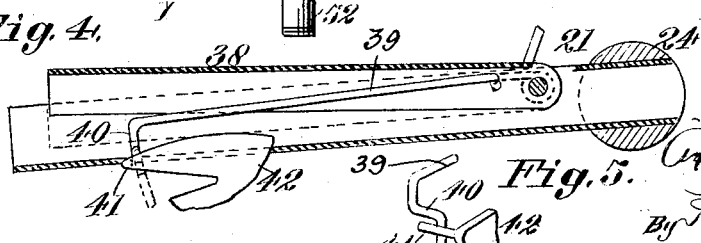

Oct. 6, 1925.  A. WAHLSTROM  1,556,136
TRAP
Filed Aug. 5, 1924   2 Sheets-Sheet 2

Inventor
Axel Wahlstrom
By Harry A Totten
Attorney

Patented Oct. 6, 1925.

1,556,136

UNITED STATES PATENT OFFICE.

AXEL WAHLSTROM, OF OAKLAND, CALIFORNIA.

TRAP.

Application filed August 5, 1924. Serial No. 730,205.

*To all whom it may concern:*

Be it known that I, AXEL WAHLSTROM, a citizen of the United States, residing at Oakland, in the county of Alameda and State of California, have invented certain new and useful Improvements in Traps, of which the following is a specification.

The present invention relates to a trap and more particularly to a rodent trap of the self setting type and designed with trigger mechanism for operation by a rodent in quest of food for actuating the mechanism whereby the rodent is precipitated into a chamber from which it is removed by an attendant when desired.

The invention consists primarily in a type of device having a movable floor maintained in inoperative position to normally support the weight of the rodent released by the rodent in its endeavor to obtain food and thrown in a downward inclination to discharge the rodent therefrom by the tiltable mechanism. It consists also in means for restoring the tiltable mechanism to its normal position, which in turn resets or relatches the trigger mechanism insuring the sustaining of the floor until such time as the trigger mechanism is again operated.

Among the objects of the invention is to provide a self setting trap containing a simple mechanism readily operated by the rodent, and one which will not arouse the suspicion of the rodent on entering the same, due to the trap being provided with numerous inlet passages and a screened or barred opening through which the bait can be seen prior to the rodent entering the main chamber containing the tiltable floor.

With the above mentioned and other objects in view, the invention consists in the novel construction and combination of parts hereinafter described, illustrated in the accompanying drawings, and set forth in the claims hereto appended, it being understood that various changes in the form, proportion, size and minor details of construction within the scope of the claims may be resorted to without departing from the spirit or sacrificing any of the advantages of the invention.

Referring particularly to the several views of the drawings wherein the preferred embodiment of my invention is illustrated:—

Figure 1 is a vertical sectional view longitudinally through the apparatus taken on line 1—1 of Figure 2.

Figure 2 is a transverse sectional view taken on line 2—2 of Figure 1, viewed in the direction of the arrow illustrating particularly the floor operating mechanism in two positions indicated respectively by full and dotted lines.

Figure 3 is a view in detail of the trap reset mechanism.

Figure 4 is a longitudinal sectional view of the trigger mechanism illustrating the stop arm co-acting with a portion of the tiltable bait hopper.

Figure 5 is a fragmentary diagrammatic view of the stop arm, stop pin, and tiltable feed hopper.

Figure 6:
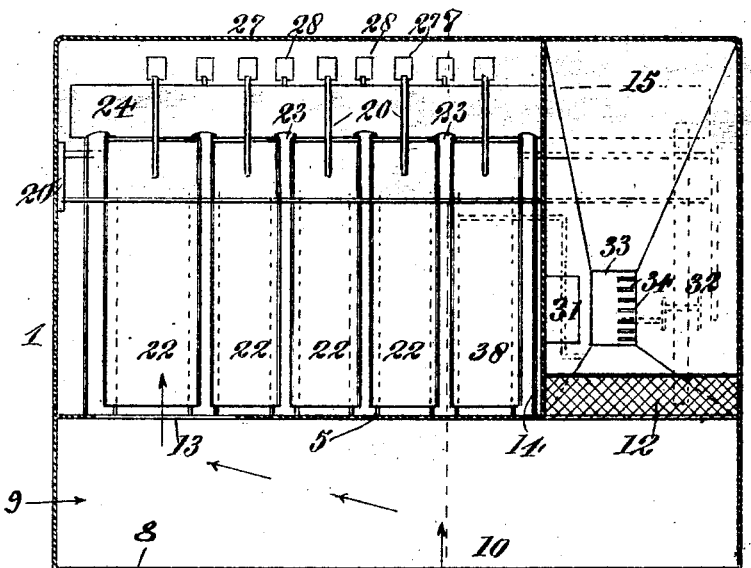
Figure 6 is a horizontal sectional view taken on line 6—6 of Figure 2, illustrating particularly the entrance hall or passage, the chamber having a tiltable floor, and bait bin or chamber.

In the drawings, wherein like characters of reference designate corresponding parts throughout the several views, 1 indicates the rectangular receptacle divided in upper and lower sections hinged together as at 2, the upper section being normally closed by a cover 3 hinged thereto as at 4. The interior of the receptacle 1 is divided longitudinally by a vertical wall 5 extending from a point beneath the cover 3 to a point a short distance above the lower edge 6 of the upper portion, and this wall 5 connects through a horizontal wall 7 extending longitudinally within the receptacle with the inner surface of the front wall 8 of the receptacle 1, providing a runway or passage 9, entrance to which may be had through the opening 10 in the front wall or opening 11 in the cover 3. The wall 5 at one end is cut away, and a piece of mesh material 12 is inserted in the cut-out portion to form one wall of a feed or bait receptacle or bin. At its opposite end, the wall 5 is provided with an opening 13. A transverse dividing wall 14 connects the wall 5 at the end of the screened aperture 12 with the rear wall of the receptacle 1 providing a feed or bait receptacle or bin 15 at one end of the receptacle and a runway chamber 16 near the opposite end of the receptacle. A rear false wall 17 is provided at the rear of the chamber 16 to afford a space 18 to house certain operative mechanism of the apparatus. By viewing Figure 7 it will be observed that the chamber 16 is without a permanent fixed floor, and to provide a floor therefor I extend longitudinally through the apparatus at the lower portion of the chamber 18, supported at one end by the frame arm 19 and at its opposite end by the plate 20, a fulcrum rod 21. On this rod are fulcrumed the respective floor plates 22 extending transversely across the open bottom of the chamber 16, and the plate supporting members 23 are also disposed transversely of the open bottom of the chamber 16. The members 23 are rigidly secured to the fulcrum rod. The floor plates 22 carry at the rear ends curved arms 26 which carry weights 27 at their free ends in the rear of a weight bar or member 24 carried by the members 23. The weight member 24 is positioned and connected to the members 23 rearwardly of the fulcrum member 21, and intermediate the weights 27, the rear side of member 24 is provided with additional weights 28. The members 22 are inverted U-shape in cross section having adjacent flanges spaced apart and received in the U-shaped members 23. This completes the floor structure for the chamber 16 which is held in floor forming position by the weight bar 24 and weights 27 and 28, and which swings downwardly under the weight of a rodent in quest of food as hereinafter set forth. From the drawings, it will be observed, the members 22 and 23 afford a pivoted bottom or floor for the chamber 16, and that said members are adapted for pivotal movement into dotted lines A, Figs. 1 and 7, to precipitate a rodent into the trap chamber 28'. The wall 14 is formed with a feed opening 29 which provides a communication between the feed hopper or bin 15 and the end of the runway 16, there being a feed diverting plate 31 extending inwardly into the hopper 30 from the upper edge of the opening 29. The curved bottom wall 32 of the feed hopper or bait receptacle or bin 15 is provided with a feed discharge opening or passage 33 in the rear of the opening 29 in the wall 14, and the free passage of food through the opening 33 is retarded by the spaced bars 34 extending across said opening. A plate 35 forms a bottom wall for the opening 29 and the same extends from a point in advance of the wall 14 to form one edge of the opening 33.

The mechanism for controlling the actuation and resetting of the floor members is constructed and operates preferably in the following manner:—

A wall 36 extending transversely of the container below the bin or chamber 31 provides a mechanism compartment 37 and therein is mounted the operating mechanism, protected from the rodents either prior to or after the same are trapped. The floor member 22 lying immediately next to the wall 14 in front of the opening 29 constitutes a trigger 38, Fig. 4, and laterally therefrom adjacent its fulcrum point 21, Fig. 4 and secured to said trigger, extends a trigger bar 39 disposed substantially parallel thereto and extending toward the free end of the member 38, where it is outwardly and downwardly bent to afford a stop arm 40 which is normally adapted to lie in rear of a stop pin 41 extending laterally from one end of an open topped feed receptacle 42. The stop arm normally retains the open top of the feed receptacle 42 beneath the opening 33, as in Figs. 1 and 2 of the drawings, and said receptacle 42 has depending therefrom an arm or extension 43 counter-weighted at its lower end as at 44 and fulcrumed within its length at 45. The extension 43 connects through a link 46 with the pivotally mounted stabilizing arm 47 which is in turn connected through a second link 48 with a crank 49 of a drum 50, all illustrated in Fig. 3. About the drum 50 is adapted to wind a flexible connection 51 carrying a weight 52. The action of the above described mechanism is as follows:—

Figures 7, 8:
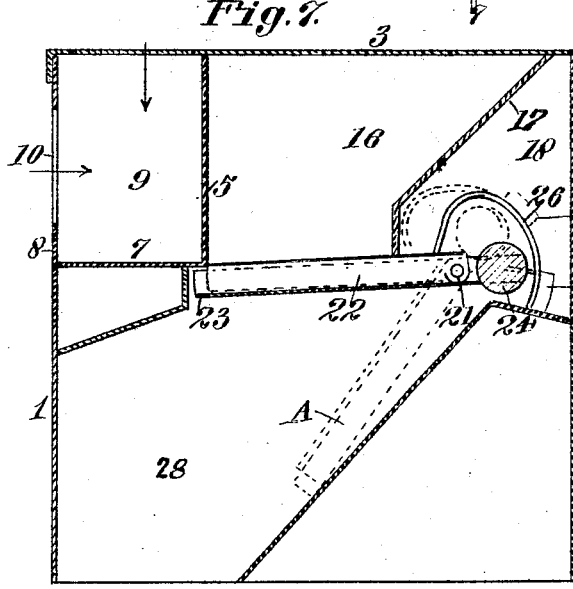
Figure 7 is a transverse sectional view on line 7—7 of Figure 6 illustrating the tiltable floor in full lines in normal position, and in dotted lines in operated position.
Figure 8 is a view in detail side elevation of the link mechanism connecting the tiltable feed hopper with a portion movable with the floor members.
Figure 9:
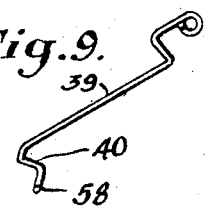
Figure 9 is a perspective view of the trigger bar.

On the trigger bar 39 being released by the operation of the trigger 38 by the weight of a rodent in its endeavor to obtain food through the opening 29, the collected food in the tiltable feed hopper will cause an overbalancing of the same from the full to dotted line position, Figs. 2 and 8. This tilting movement will through the links 46 and 48 and the stabilizer bar 47 impart a winding movement to the drum 50 to raise the weight 52. The latter is not sufficient to materially retard the tilting action of the feed hopper but is sufficient to cause a rapid restoring of the feed hopper to full line position as soon as its contents is dumped therefrom on the completion of its tilting operation.

The mechanism which ensures the tilting of the members 22 and 23 from full to dotted line position, Fig. 7, to precipitate the rodent into the chamber 28', is particularly illustrated in Figs. 1, 2 and 8 of the drawings. In the chamber 37 there is disposed a lever 53 connected with the end of member 21 to which the members 23 are rigidly secured and on which the members 22 fulcrum. The lever 53 connects through a pair of links 54 with the second pair of links 55 fulcrumed to the shaft 45 on which the extension 43 pivots. Laterally from the lower pair of links 55 extends a contact arm 56 with which is adapted to engage a contact finger 57 carried by the extension 43 and extending at substantially right angles from one face thereof. It will be observed that on the tilting of the member 42, the finger 57 will move and engage the arm 56, the latter operating the link connection 54—55 and causing a lowering of the lever 53. The members 22 and 23 are operated by the rotation of shaft 21 from the full to the dotted line position through the operation of lever 53. A rodent on the floor members is then precipitated into chamber 28. The counter balance weights 24, 27 and 28 will cause a return of the members 22 and 23 and link operating mechanism to normal position with the upward movement of the hopper 42 on the shaft 45. This hopper 42 when empty and on arriving at approximately its normal position is travelling with sufficient momentum to cause the pin 41 to slide beneath the curved extension 58 of stop arm 40 and again contact with the front face of the stop arm, as in Fig. 5 of the drawings.

While I have shown the bottom of the receptacle 28' as being open, this is to facilitate the precipitation of the rodents into a closed fluid containing chamber for the drowning thereof, although the chamber may be provided with a floor and the rodent trapped therein disposed of in another manner. The food, such as a mixture of grain and gravel, or other like bait, may be discharged into any suitable apparatus, or if desired may be discharged beneath the trap to serve as a bait to entice the rodents to the trap.

The operation of the device may be briefly described as follows:—

A rodent entering aperture 10 finds its way into chamber 16 through aperture 13, is attracted by the feed, viewed through opening 29, and walks towards the opening on the members 22. Stepping on the member 38 the weight of the rodent depresses the same and causes a release of the hopper 42 which swings downwardly from the position in full lines, Fig. 8, to that in dotted lines, Fig. 8. In this movement the member 53 is pulled downwardly pivotally operating the member 21, which, in turn, causes a downward swinging movement of the members 23, enabling the members 22, supporting the weight, to be tilted downwardly thereby and deposit their burden in the rodent chamber. As the hopper 42 is freed of its contents by dumping the same therefrom, the weights 44 and 52 cause its return to full line position, Fig. 8, and this operation moves the member 53 upwardly, providing a support beneath the members 22, and when in full raised position the hopper is precluded from tilting downwardly by the portion 40 of the member 39 lying in rear thereof until such time as the member 38 is again depressed.

I claim:

1. A trap consisting of a plurality of superimposed chambers, a tiltable division wall separating the same and forming a floor for the upper chamber, a bait holding means accessible from the upper chamber, a pivotally suspended member provided with a hopper at its upper end, a trigger mechanism for normally maintaining said pivotally suspended member in substantially upright position, mechanism actuated by the operative swinging movement of the pivotally suspended member for imparting a tilting movement to the division wall, means for supplying material to the hopper for causing pivotal movement of the suspended member, and means for restoring said dividing wall and said pivotally suspended member to their normal positions on the dumping of the charge from said hopper.

2. A trap consisting of a receptacle divided into a plurality of superimposed communicating chambers, a tiltable division wall separating the chambers and forming a floor for the upper chamber, bait holding means within the receptacle accessible from the upper chamber, a pivotally suspended member provided at its upper end with a hopper, trigger mechanism coacting with the suspended member for retaining the same in substantially upright position, said trigger mechanism being weight actuated to release said hopper, devices for normally retaining said tiltable division wall in substantially horizontal position, an operating connection between the pivotally suspended member and said devices whereby said devices are actuated on the release of said pivotally suspended member to impart a tilting movement to the division wall, means for supplying material to the hopper for causing a pivotal movement of the suspending member, means for restoring the pivotally suspended member to normal position in engagement with the trigger on the dumping of the charge therefrom, and means for restoring the division wall to its normal position on the discharge of a weighted body therefrom.

3. A trap consisting of a receptacle divided into a plurality of communicating superimposed chambers, a tiltable division wall separating the same and forming a floor for the upper chamber, a bait hopper accessible from the upper chamber, a pivotally suspended hopper member in communication with the bait hopper, a trigger mechanism constituting a portion of the division wall and normally coacting with said pivotally mounted hopper for maintaining the same in substantially upright position, said trigger adapted for weight actuation to release the pivotally mounted hopper to permit the tilting thereof, means for normally retaining the division wall locked in substantially horizontal position, said means adapted for operation on the tilting of said pivoted hopper for causing a pivotal movement of the division wall, means for restoring said division wall to its normal position on the dumping of the contents from said hopper, and means for restoring the hopper to normal position in engagement with the trigger.

4. A trap consisting of a receptacle divided into a plurality of communicating superimposed chambers, a tiltable division wall separating the same and forming a floor for the upper chamber, said division wall consisting of a plurality of floor members pivotally supported adjacent one end, counterbalancing means associated with the floor members for maintaining the same balanced in substantially horizontal position, a plurality of pivotally mounted floor supporting means lying beneath the floor members and adapted for tilting in unison, means for normally maintaining said latter members locked in floor member supporting position, a trigger mechanism, a tiltable hopper normally maintained in upright position by said trigger mechanism, and means for operating the floor support-locking means by the pivotal movement of said hopper on the operation of said trigger mechanism.

5. A trap including a receptacle formed with superimposed communicating chambers therein, a tiltable division wall forming a separating floor between the chambers and consisting of parallel floor members pivotally supported at one end, counterbalancing means for normally retaining the floor members in substantially horizontal position, pivotally mounted floor member supporting means lying beneath the floor members and on which the same rest, means for normally maintaining the floor member supporting means locked in supporting position, a pivotally mounted actuating member for said floor member supporting means, a weight actuated trigger normally retaining said operating member in operative position, an operating connection between the floor locking means and the pivotally actuated member whereby said locking means is released on the pivotal movement of the actuating member to permit the floor member supporting means to pivot on its axis and move the free end thereof from beneath the floor member.

In testimony whereof I have signed my name to this specification.

AXEL WAHLSTROM.